United States Patent [19]

Genequand et al.

[11] 4,238,246
[45] Dec. 9, 1980

[54] SOLAR ENERGY SYSTEM WITH COMPOSITE CONCENTRATING LENSES

[75] Inventors: Pierre Genequand, Geneva, Switzerland; Virgil Stark, New York, N.Y.

[73] Assignee: North American Utility Construction Corp., New York, N.Y.

[21] Appl. No.: 44,902

[22] Filed: Jun. 4, 1979

[51] Int. Cl.³ .......................... H01L 3/04; F24J 3/02
[52] U.S. Cl. ................................ 136/248; 126/438; 126/439; 126/440; 136/246; 350/202; 350/211
[58] Field of Search ........ 136/89 PC, 89 HY, 89 CA; 126/438, 439, 440; 350/211, 202

[56] References Cited
U.S. PATENT DOCUMENTS

| 3,985,118 | 10/1976 | Bard | 126/425 |
| 4,022,186 | 5/1977 | Northrup, Jr. | 126/440 |
| 4,069,812 | 1/1978 | O'Neill | 136/89 PC |
| 4,134,393 | 1/1979 | Stark et al. | 136/89 HY X |

Primary Examiner—Aaron Weisstuch
Attorney, Agent, or Firm—Kenyon & Kenyon

[57] ABSTRACT

In order to improve the efficiency of a solar energy system utilizing a Fresnel lens for concentrating solar rays on a conduit system or the like, only the central portion of a Fresnel lens, otherwise of large width, is utilized and slide assemblies, each containing a plurality of slats with a reflective coating and disposed at an angle such as to reflect solar energy to the same focal point as the Fresnel lens, are disposed on each side of the lens thereby effectively increasing the aperture of the lens and increasing efficiency of concentration.

10 Claims, 1 Drawing Figure

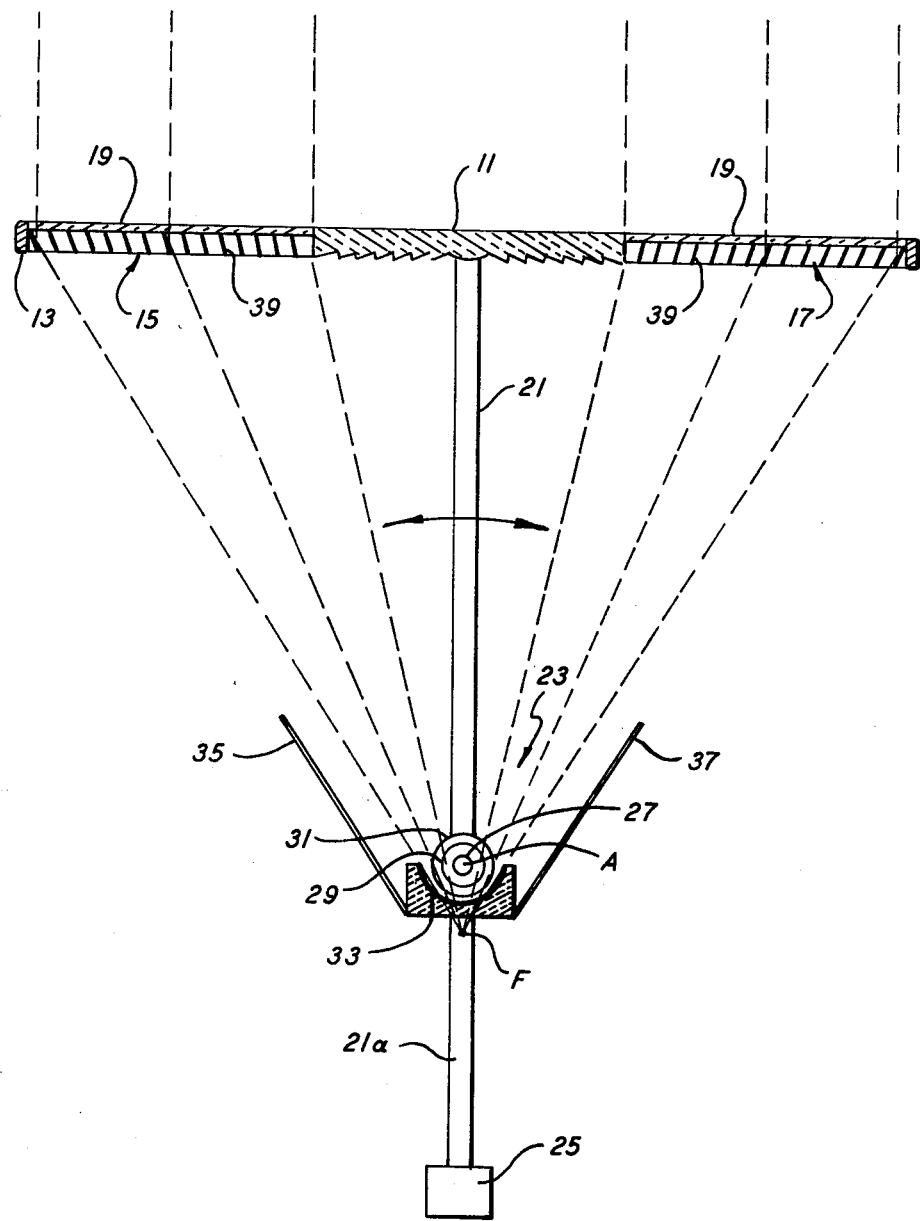

SOLAR ENERGY SYSTEM WITH COMPOSITE CONCENTRATING LENSES

BACKGROUND OF THE INVENTION

This invention relates to solar energy systems in general and more particularly to an improved concentrating lens arrangement for use in solar energy systems.

Various solar energy systems have been developed. Of particular interest are the types of systems disclosed in U.S. Pat. No. 4,134,393 and in Ser. Nos. 866,067 filed Dec. 30, 1977, 866,068 filed Dec. 30, 1977, 806,291 filed June 15, 1977, 845,862 filed Oct. 31, 1977, 807,513 filed June 20, 1977, 915,001 filed June 13, 1978, 920,288 filed June 29, 1978, and 1,175 filed Jan. 5, 1979 all of which are assigned to the same assignee of the present invention.

A number of these systems utilize Fresnel lenses made of waterwhite glass in the largest sizes available throughout the world. For example, they are up to 86 cm in width by 240 cm in length. Fresnel lenses are particularly attractive for concentrating solar energy because of their low price. This permits systems of the nature described in the aforementioned patent and applications to produce energy more economically than other previously existing solar systems. In the aforementioned patent and applications there are various uses to which the solar energy which is collected may be put. For example, it may be used for heating, refrigeration, distillation of salty water, generation of electricity with high efficiency utilizing photovoltaic cells and production of electricity or other work through the use of thermal energy, i.e., by means of turbines or other engines.

In a typical type of system disclosed therein, a Fresnel lens is supported above a conduit system which includes at least an inner and an outer conduit. The focus of the Fresnel lens is directed onto or below the conduit system so as to concentrate solar energy thereon. The conduit system normally remains fixed, with the Fresnel lens, its frame and an appropriate counterweight supported by rotation about the axis of the inner tube in the conduit so as to follow the movement of the sun from east to west during the day. Typically, the whole system is tilted as a function of the elevation of its location. Tilting may be varied throughout the year to take into account the varying angle of the sun.

Although Fresnel lenses have been found the most useful and economical, it has been discovered that the Fresnel lenses conventionally available have a higher efficiency of concentration in their central section than near the edges. This is primarily because the refractive prisms in the Fresnel lens cannot be made with sharp ends, thereby causing some dispersion of the solar rays as the number of prisms per unit width is increased toward the edges of the lenses. The efficiency of solar transmission is, for example, about 90% in the center, i.e., from the center of the lens for a distance of about 16 cm, 85% for about the next 12 cm, 80% for approximately the next 10 cm and then 70-75% toward the edges of the aperture.

It thus becomes evident that there is a need for improving the transmission efficiency of a Fresnel lens used in concentrating solar energy.

SUMMARY OF THE INVENTION

It is thus the object of the present invention to provide an improved concentrating lens assembly for use in a solar energy system.

The present invention accomplishes this object by utilizing only the central part of a linear Fresnel lens where the highest efficiency of transmission is obtained. For example, only 60 cm in the central section of what would otherwise be an 86 cm wide lens is used, thereby insuring a minimum efficiency of about 85%. In order to still provide a wide aperture to obtain greater concentration of solar energy, adjacent to the Fresnel lenses, on each side, a set of reflective slats, termed a slide assembly, installed in a frame and supported so as to reflect incident solar rays onto the same focus as the focus of the Fresnel lens are provided. In order that all slats reflect energy on the same focal point, they are at varying angles depending on the distance from the center of the lens and are spaced from each other in such a manner so as to not shadow an adjacent slide which is inclined at a slightly different angle. The slats can have different widths up to about 4 cm. The slats can have an aperture of, for example, from 50 to 90 cm and will have the same length as the Fresnel lens, i.e., in the example, about 240 cm. If one assumes focusing the energy on a 4 inch conduit system and also assumes a 60 cm wide Fresnel lens with 60 cm wide slide assemblies on each side, the concentration will be from 180 cm down to 4 cm or 45 times.

BRIEF DESCRIPTION OF THE DRAWINGS

The single FIGURE is an elevation view of a concentrating lens arrangement according to the present invention.

DETAILED DESCRIPTION OF THE INVENTION

As illustrated by the single FIGURE, a Fresnel lens 11 of, for example, 60 cm width and 240 cm length, is disposed in a common frame 13 along with slide assemblies 15 and 17, one on each side of the lens. Each of the slide assemblies comprising a plurality on slats 39 is covered by a protective sheet 19 of a transparent material such as glass or plastic. The frame containing the Fresnel lens and the slide assemblies 15 and 17 is supported for rotation by means of a central support 21. Additional supports may also be provided. Rotation is about the axis A of a concentric tube system indicated generally as 23. The support 21 is extended as a support 21a on the end of which is a counterweight 25 to balance the weight of the lens arrangement. Appropriate motor drives and sensorial systems of the type described in the aforementioned patent and applications will be provided to rotate the assembly about the axis A to follow the movement of the sun on a daily basis. The unit will also be tilted with respect to the horizontal depending on its latitude of location and, possibly, the time of year.

Any of the conduit systems described in the aforementioned patent and applications can be used as the conduit system 23. The illustrated system is a three conduit system with an inner conduit 27, and intermediate conduit 29 and an outer conduit 31. As an example, the outside diameter of the conduit system can be 4 cm, in which case, if one assumes a Fresnel lens of 60 cm width and slide assemblies 15 and 19 of equal width, a concentration of 45 times will result. Disposed below the conduit system, assuming that the outer and intermediate conduits at least are of a transparent material, is a mirror 33. Also shown are mirrors 35 and 37 on each side of the conduit assembly 23 to further aid in concentration of energy.

If desired, solar cells may be disposed within the inner tube as disclosed in the aforementioned applications. The high concentration which is obtained is particularly advantageous for generating electricity using solar cells, i.e., photovoltaic cells, since production of electricity from the luminous rays (0.4 to 0.75 microns) increases almost proportionally with the concentration. As described in the aforementioned applications, there will be fluids in the spaces between the tubes. The fluids between the intermediate or inner and outer tube in particular will absorb infrared radiation to prevent overheating of the solar cells. Furthermore, heat from the fluid in the inner tube is transferred to the fluids in the outer tube resulting in an efficient heat collection and transfer, all as explained in detail in the aforementioned applications. The filtering of the infrared radiation by the fluids, in the case of using photovoltaic cells, avoids the decrease in electricity production which is associated with heating of the cell.

When used for heating fluids, it will be possible, with the concentration available with this system, to heat the fluids circulating in the inside tubes to high temperatures of about 300° C. permitting a production of power by thermal means such as turbines or engines utilizing the Carnot cycle of absolute temperature.

The reflective slide assemblies 15 and 17 which are essentially identical each comprise a plurality of slats 39 supported in a frame with a predetermined angle, i.e., an angle which will result in incident solar energy being reflected to a focal point located either at or below the axis A of the FIGURE. The reflective slats may be made of polished aluminum or aluminized or silvered steel, glass or plastic. The reflective slats may be individually constructed and assembled into the frame in this manner. Alternatively, the whole assembly can be molded of plastic or other material and the slats then properly coated with a reflective material. The slats may be of different width and their spacing will be such that one does not shadow the other. As noted above, the slide assemblies 15 and 17 will be installed in a common frame 13 with the Fresnel lens 11. When utilized in the Northern Hemisphere, the assembly will typically be tilted at an angle of, for example, 30 degrees for a 35 degree latitude. This angle may remain fixed or, if desired, it can be varied throughout the year to take into account the elevation of the sun.

Although only a single unit is illustrated on the FIGURE, a plurality of units in series and/or parallel can be provided much in the manner discussed in the aforementioned applications. In such cases, the conduits 23 of the individual units will be interconnected, either in series or parallel depending on the needs of the particular system.

Furthermore, as noted above, the slide assemblies 15 and 19 can have widths up to 90 cm. Naturally, the amount of energy collected will depend on the selected width as will the concentration of energy.

What is claimed is:

1. A concentrating lens arrangement for collecting and focusing solar energy comprising:
   a linear Fresnel lens having a width limited so that the transmission efficiency thereof does not drop below approximately 85% at its edges;
   first and second slide assemblies disposed adjacent the two longitudinal edges of said Fresnel lens, each of said slide assemblies comprising a plurality of slats having thereon a reflective surface, tilted at an angle such as to reflect incident solar energy to the same focal point as the focus of said Fresnel lens; and
   a frame for holding said Fresnel lens and slide assemblies together.

2. An arrangement according to claim 1, wherein said Fresnel lens has a width of approximately 60 cm and a length of approximately 240 cm and said slide assemblies have a corresponding length and a width of up to approximately 90 cm.

3. An arrangement according to claim 2, wherein said slide assemblies have a width of approximately 60 cm.

4. An apparatus according to claim 1, wherein said slats in said slide assemblies are made of a material selected from the group consisting of polished aluminum, aluminized steel, aluminized glass, aluminized plastic, silvered steel, silvered glass and silvered plastic.

5. An arrangement according to claim 1, wherein said slats in each of said slide assemblies comprise an integral molded unit with the slats therein coated with a reflective coating.

6. The arrangement according to claim 1, in combination with a conduit system for collecting solar energy in the form of thermal energy and further including:
   (a) support means for supporting said arrangement over said conduit system so as to be rotatable about the axis of said conduit; and
   (b) a counterweight for balancing the weight of said arrangement, whereby said arrangement may be rotated about the axis of said conduit system to track the movement of the sun from East to West.

7. An arrangement according to claim 6, and further including a mirrored surface disposed below said conduit system.

8. An arrangement according to claim 7, and further including first and second longitudinally extending mirrors disposed at an angle adjacent opposite sides of said conduit system to reflect additional radiation thereon.

9. An arrangement according to claim 6, wherein said conduit system includes transparent concentric tubes and further including an array of photovoltaic cells disposed within the innermost tube of said conduit and at least one fluid flowing between the innermost conduit and an outer conduit, whereby said fluid will absorb infrared radiation while passing radiation of a wavelength which will activate said photovoltaic cells to produce electricity.

10. An arrangement according to claim 1, and further including a transparent protective sheet disposed over each of said slide assemblies.

* * * * *